US012699776B2

(12) United States Patent
Hyun et al.

(10) Patent No.: US 12,699,776 B2
(45) Date of Patent: Aug. 4, 2026

(54) METHOD FOR REPROGRAM WITH ENHANCED SECURITY

(71) Applicant: HYUNDAI AUTOEVER CORP., Seoul (KR)

(72) Inventors: Sung Hwan Hyun, Seoul (KR); Won Sik Cho, Seoul (KR); Dong Jin Jeon, Seoul (KR); Joong Seok Oh, Seoul (KR)

(73) Assignee: HYUNDAI AUTOEVER CORP., Seoul (KR)

( * ) Notice: Subject to any disclaimer, the term of this patent is extended or adjusted under 35 U.S.C. 154(b) by 126 days.

(21) Appl. No.: 18/392,609

(22) Filed: Dec. 21, 2023

(65) Prior Publication Data

US 2024/0211600 A1      Jun. 27, 2024

(30) Foreign Application Priority Data

Dec. 26, 2022     (KR) ........................ 10-2022-0184434

(51) Int. Cl.
| | |
|---|---|
| *G06F 21/57* | (2013.01) |
| *G06F 21/31* | (2013.01) |
| *G06F 21/54* | (2013.01) |

(52) U.S. Cl.
CPC ............ G06F 21/572 (2013.01); G06F 21/31 (2013.01); G06F 21/54 (2013.01)

(58) Field of Classification Search
CPC ......... G06F 21/572; G06F 21/31; G06F 21/54
See application file for complete search history.

(56) References Cited

U.S. PATENT DOCUMENTS

| | | | |
|---|---|---|---|
| 11,347,837 B2 | 5/2022 | Shin | |
| 2013/0111582 A1* | 5/2013 | Forest ..................... | G06F 21/44 |
| | | | 726/19 |
| 2016/0035147 A1* | 2/2016 | Huang .................. | H04L 9/3271 |
| | | | 701/31.4 |

(Continued)

FOREIGN PATENT DOCUMENTS

| | | |
|---|---|---|
| KR | 20010027037 A | 4/2001 |
| KR | 20080018647 A | 2/2008 |

(Continued)

OTHER PUBLICATIONS

Office Action cited in Korean patent application No. 10-2022-0184434; Oct. 29, 2024; 8 pp.

(Continued)

*Primary Examiner* — Kim Huynh
(74) *Attorney, Agent, or Firm* — Lempia Summerfield Katz LLC

(57) ABSTRACT

A method performed by an electronic control unit (ECU) for reprogramming with enhanced security. The method includes checking whether a cyber security function of a ROM of the ECU is applied while the ECU is running in a NORMAL area, receiving, when it is confirmed that the cyber security function of the ROM of the ECU is applied, a first backdoor password for the cyber security function of the ROM of the ECU, and performing, when the received first backdoor password is the same as a second backdoor password included in program data stored in the ROM of the ECU, reprogramming of the ECU without additional procedures related to the cyber security function.

10 Claims, 9 Drawing Sheets

(56) References Cited

U.S. PATENT DOCUMENTS

| | | | | |
|---|---|---|---|---|
| 2017/0242678 A1* | 8/2017 | Sangameswaran | ..... | G06F 8/656 |
| 2019/0034637 A1* | 1/2019 | Cho | ........................ | H04L 63/08 |
| 2020/0184066 A1 | 6/2020 | Shin | | |
| 2023/0169174 A1* | 6/2023 | Jung | ........................ | G06F 21/64 |
| | | | | 726/26 |
| 2024/0053974 A1* | 2/2024 | Cardillo | .................... | G06F 8/71 |

FOREIGN PATENT DOCUMENTS

| | | | |
|---|---|---|---|
| KR | 20130006963 A | 1/2013 | |
| KR | 20130079775 A | 7/2013 | |
| KR | 102176378 B1 | 11/2020 | |

OTHER PUBLICATIONS

Kim Jin-Cheol et al., Cybersecurity Technology Development Trends in the Power Control Field; Journal of the Korean Society for Information Security, vol. 30, No. 5, Oct. 2020; pp. 1-10.

Notice of Allowance dated Jun. 23, 2025 of KR Patent Appln. No. 10-2022-0184434; 4 pp.

Seulgirom Lee et al., Attack Scenarios Based on UNECE Automotive Cybersecurity Regulation (UNR. 155); Transactions of KSAE, vol. 29, No. 8, Aug. 2021; pp. 717-732.

Soo-Young Kang et al., Analysis of Security Requirements for Secure Update of IVI(In-Vehicle-Infotainment) Using Threat Modeling and Common Criteria; Journal of The Korea Institute of Information Security & Cryptology; vol. 29, No. 3, Jun. 2019; pp. 613-628.

* cited by examiner

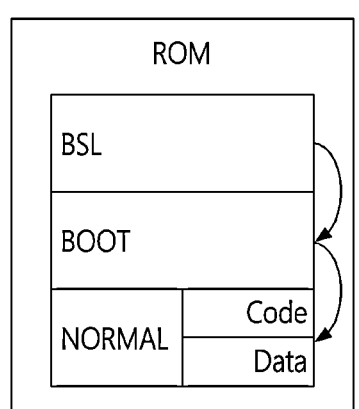
10
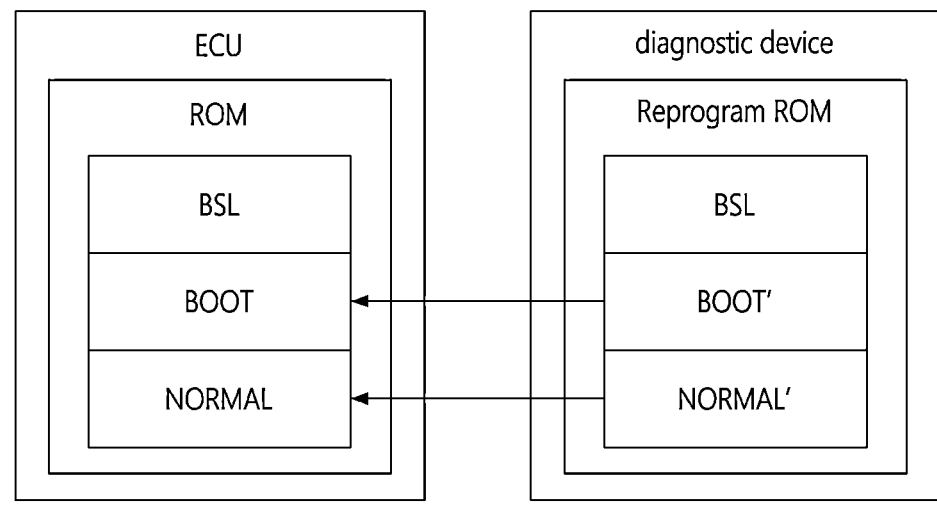
20
FIG. 1 "PRIOR ART"

<u>40</u>                                        <u>50</u>

METHOD FOR REPROGRAM WITH ENHANCED SECURITY

CROSS REFERENCE TO RELATED APPLICATIONS

This application claims priority to and the benefit of Korean Patent Application No. 10-2022-0184434, filed on Dec. 26, 2022, in the Korean Intellectual Property Office, the disclosure of which is incorporated herein by reference in its entirety.

FIELD

Embodiments of the present disclosure relate to a reprogramming method with enhanced security and an electronic control unit to which the method is applied.

BACKGROUND

The statements in this section merely provide background information related to the present disclosure and may not constitute prior art.

In general, many electronic control units (ECUs), including engine controllers, are applied to vehicles to control the operation of the vehicle. ECUs for vehicles may be reprogrammed (updated) for the purpose of improving performance, developing technology, and correcting defects.

FIG. 1 depicts a diagram for explaining a reprogramming method of an ECU.

Referring to FIG. 1, the vehicle software mounted on the ECU is embedded in a ROM (Read only Memory) 10, and the ROM 10, in which the vehicle software is embedded, has a BSL (Boot Strap Loader) area for reprogramming the boot area, a boot area for reprogramming a NORMAL area, and a NORMAL area where application code is executed.

The BSL area contains the code necessary for a reprogram of the boot area, and when the ECU is turned on, it enters the BSL area.

The boot area contains the code necessary for a reprogram of the NORMAL area, and after the normal state of the boot area is confirmed in the BSL area, the boot area is entered.

The NORMAL area contains codes necessary for control execution in an actual ECU, and after the normal state of the NORMAL area is confirmed in the boot area, the NORMAL area is entered.

Each area except the BSL area may be reprogrammed for the purpose of improving performance, developing technology, and correcting defects, and is implemented so that upper area software may be changed in a lower area. For example, a reprogram of the boot area may be performed in the BSL area, which is a lower area, and a reprogram of the NORMAL area may be performed in the boot area, which is a lower area.

Referring again to FIG. 1, a method of reprogramming the ROM of an ECU using the reprogram ROM of a diagnostic device is shown (20).

When reprogramming the ECU, if the information of the ROM mounted on the ECU matches the information of the reprogram ROM of the diagnostic device to be reprogrammed, the reprogram may be performed. Here, the reprogram ROM of the diagnostic device may be, for example, a HEX format file.

Problems may occur during the reprogramming process of the boot area of the vehicle's ECU. For example, if entry into the BSL area where a boot reprogram is performed fails, entry into the lower level of the boot area is impossible. As a result, a problem may occur in which a reprogram of the boot area becomes impossible.

Other problems may arise during the reprogramming process of the boot area of the vehicle's ECU, for example, if a cyber security function is applied to the ROM mounted on the ECU, and a cyber security function is not applied to the reprogram ROM of the diagnostic device, the presence or absence of the cyber security function cannot be determined, which may result in the cyber security function being lost when the ROM mounted on the ECU is reprogrammed.

SUMMARY

Embodiments of the present disclosure provide a boot reprogramming method in cases where entry into the BSL area of an ECU is impossible.

Embodiments of the present disclosure further provide a method and apparatus for determining whether a cyber security function is applied during a reprogramming process of an ECU.

Embodiments of the present disclosure further provide a method and apparatus for performing reprogram regardless of whether a cyber security function is applied.

Embodiments of the present disclosure further provide a software-based method of improving problems that occur during a boot area reprogramming process of an ECU.

The embodiments of the present disclosure are not limited to the technical problems mentioned above, and other technical problems not mentioned may be clearly understood by those having ordinary skill in the art from the description below.

According to an aspect of the present disclosure, a method performed by an electronic control unit (ECU) for reprogramming with enhanced security is provided. The method may include: checking whether a cyber security function of a ROM of the ECU is applied while the ECU is running in a NORMAL area; receiving, when it is confirmed that the cyber security function of the ROM of the ECU is applied, a first backdoor password for the cyber security function of the ROM of the ECU; and performing, when the received first backdoor password is the same as a second backdoor password included in program data stored in the ROM of the ECU, a reprogram of the ECU without additional procedures related to the cyber security function.

In some embodiments, performing the reprogram of the ECU may include: changing a state of a boot area of the ECU, entering a Boot Strap Loader (BSL) area of the ECU based on the changed state of the boot area, and performing the reprogram of the boot area by checking ROM information in the BSL area.

In some embodiments of the present disclosure, the method may include: before checking whether the cyber security function of the ROM of the ECU is applied, checking whether ROM identification information stored in the boot area and ROM identification information stored in a diagnostic device match; checking, when it is confirmed that the ROM identification information stored in the boot area and the ROM identification information stored in the diagnostic device do not match, whether ROM identification information stored in the BSL area and the ROM identification information stored in the diagnostic device do not match; and checking, when the ROM identification information stored in the BSL area and the ROM identification information stored in the diagnostic device do not match, information necessary for reprogram of the boot area.

In some embodiments of the present disclosure, checking whether the cyber security function is applied may include:

verifying a validity of a reprogram ROM of a diagnostic device; checking, when the validity is verified, whether the cyber security function of the ECU is applied; and checking, when it is confirmed that the cyber security function of the ECU is applied, whether a cyber security function of the diagnostic device is applied.

According to an aspect of the present disclosure, a method performed by an electronic control unit (ECU) for reprogramming with enhanced security is provided. The method may include: checking whether a cyber security function is applied to each of a ROM of the ECU and a reprogram ROM of a diagnostic device while the ECU is running in a NORMAL area; and stopping when it is confirmed that the cyber security function is applied to the ROM of the ECU and the cyber security function is not applied to the reprogram ROM of the diagnostic device, performing a reprogram of the ECU.

In some embodiments of the present disclosure, the method may further include: before checking whether the cyber security function of the ROM of the ECU is applied, checking whether ROM identification information stored in the boot area and ROM identification information stored in the diagnostic device match; checking, when it is confirmed that the ROM identification information stored in the boot area and the ROM identification information stored in the diagnostic device do not match, whether ROM identification information stored in the BSL area and the ROM identification information stored in the diagnostic device do not match; and checking, when the ROM identification information stored in the BSL area and the ROM identification information stored in the diagnostic device do not match, information necessary for reprogram of the boot area.

According to an aspect of the present disclosure, an electronic control unit (ECU) is provided. The ECU may include one or more processors, a memory that loads a computer program executed by the processor, and a storage for storing the computer program. The computer program includes instructions for performing operations including: checking whether a cyber security function of a ROM of the ECU is applied while the ECU is running in a NORMAL area; receiving, when it is confirmed that the cyber security function of the ROM of the ECU is applied, a first backdoor password for the cyber security function of the ROM of the ECU; and performing, when the received first backdoor password is the same as a second backdoor password included in program data stored in the ROM of the ECU, a reprogram of the ECU without additional procedures related to the cyber security function.

In some embodiments of the present disclosure, performing the reprogram of the ECU may include changing a state of a boot area of the ECU, entering a Boot Strap Loader (BSL) area of the ECU based on the changed state of the boot area, and performing the reprogram of the boot area by checking ROM information in the BSL area.

In some embodiments of the present disclosure, the computer program further includes instructions for performing operations that may include: before checking whether the cyber security function of the ROM of the ECU is applied, checking whether ROM identification information stored in the boot area and ROM identification information stored in a diagnostic device match; checking, when it is confirmed that the ROM identification information stored in the boot area and the ROM identification information stored in the diagnostic device do not match, whether ROM identification information stored in the BSL area and the ROM identification information stored in the diagnostic device do not match; and checking, when the ROM identification information stored in the BSL area and the ROM identification information stored in the diagnostic device do not match, information necessary for reprogram of the boot area.

In some embodiments of the present disclosure, checking whether the cyber security function is applied may include: verifying validity of a reprogram ROM of a diagnostic device; checking, when the validity is verified, whether the cyber security function of the ECU is applied; and checking, when it is confirmed that the cyber security function of the ECU is applied, whether a cyber security function of the diagnostic device is applied.

According to an aspect of the present disclosure, an electronic control unit (ECU) is provided. The ECU may include one or more processors, a memory that loads a computer program executed by the processor, and a storage for storing the computer program. The computer program includes instructions for performing operations including: checking whether a cyber security function is applied to each of a ROM of the ECU and a reprogram ROM of a diagnostic device while the ECU is operating in a NORMAL area; and stopping, when it is confirmed that the cyber security function is applied to the ROM of the ECU and that the cyber security function is not applied to the reprogram ROM of the diagnostic device, a reprogram of the ECU.

In some embodiments of the present disclosure, the computer program may further include instructions for performing operations including: before checking whether the cyber security function is applied to the ROM of the ECU, checking whether ROM identification information stored in the boot area and ROM identification information stored in the diagnostic device match; checking, when it is confirmed that the ROM identification information stored in the boot area and the ROM identification information stored in the diagnostic device do not match, whether ROM identification information stored in the BSL area and the ROM identification information stored in the diagnostic device do not match; and checking, when the ROM identification information stored in the BSL area and the ROM identification information stored in the diagnostic device do not match, information necessary for a reprogram of the boot area.

BRIEF DESCRIPTION OF THE DRAWINGS

The above and other aspects and features of the present disclosure should become more apparent by describing in detail embodiments thereof with reference to the drawings.

FIG. 1 depicts a diagram for explaining a reprogramming method of an ECU.

DETAILED DESCRIPTION

Figure 2:
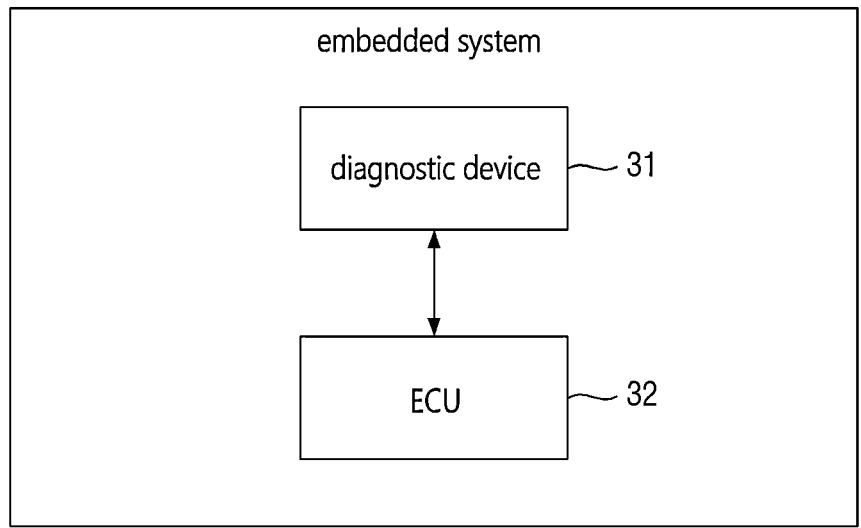
FIG. 2 depicts a configuration diagram of an embedded system for reprogramming an ECU according to an embodiment of the present disclosure.

Hereinafter embodiments of the present disclosure are described with reference to the attached drawings. Advantages and features of the present disclosure and methods of accomplishing the same may be understood more readily by reference to the following detailed description of the embodiments and the accompanying drawings. The present disclosure may, however, be embodied in many different forms and should not be construed as being limited to the embodiments set forth herein. Rather, these embodiments are provided so that this disclosure is thorough and complete and fully conveys the concept of the disclosure to those having ordinary skill in the art, and the present disclosure is defined by the claims.

In adding reference numerals to the components of each drawing, it should be noted that the same reference numerals are assigned to the same components as much as possible even though they are shown in different drawings. In addition, in describing the present disclosure, when it is determined that the detailed description of the related well-known configuration or function may obscure the gist of the present disclosure, the detailed description thereof are omitted.

Unless otherwise defined, all terms used in the present specification (including technical and scientific terms) may be used in a sense that may be commonly understood by those having ordinary skill in the art. In addition, the terms defined in the commonly used dictionaries are not ideally or excessively interpreted unless they are specifically defined clearly. The terminology used herein is for the purpose of describing particular embodiments only and is not intended to be limiting of the disclosure. In this specification, the singular also includes the plural unless specifically stated otherwise in the phrase.

In addition, in describing the component of this disclosure, terms, such as first, second, A, B, (a), (b), may be used. These terms are only for distinguishing the components from other components, and the nature or order of the components is not limited by the terms. If a component is described as being "connected," "coupled" or "contacted" to another component, that component may be directly connected to or contacted with that other component, but it should be understood that another component also may be "connected," "coupled" or "contacted" between each component.

When a component, device, element, or the like of the present disclosure is described as having a purpose or performing an operation, function, or the like, the component, device, or element should be considered herein as being "configured to" meet that purpose or to perform that operation or function.

Hereinafter, several embodiments of the present disclosure are described with reference to the drawings.

FIG. 2 depicts a configuration diagram of an embedded system for reprogramming an ECU according to an embodiment of the present disclosure.

As shown in FIG. 2, the embedded system 30 may include a diagnostic device 31 that communicates with a server (not shown) and an ECU 32, and the ECU 32 that communicates with the diagnostic device 31. Here, the ECU 32 included in the embedded system 30 is not limited to this, and the embedded system 30 may include a plurality of ECUs.

According to an embodiment of the present disclosure, the diagnostic device 31 may be a diagnostic device externally connected to the embedded system 30 in order to reprogram the electronic control device 32.

According to an embodiment of the present disclosure, the embedded system 30 of the present disclosure may be a mobile embedded system. For example, the embedded system 30 may be an embedded system for a vehicle.

The diagnostic device 31 may perform reprogramming of the ECU 32. The ECU 32 and the diagnostic device 31 may be connected and communicate through a network. For example, the diagnostic device 31 and the ECU 32 are connected through a CAN bus and may transmit and receive data through CAN communication. The network method between the diagnostic device 31 and the ECU 32 of the present disclosure is not limited to this, and communication may be performed according to a CAN-FD, LIN, or Ethernet communication protocol.

The diagnostic device 31 may store information about the ECU 32 connected to the network. The diagnostic device 31 may determine the state of the ECU 32, determine the ECU that needs reprogramming, and perform reprogramming.

According to an embodiment of the present disclosure, the diagnostic device 31 may determine the area in running of ECU 32, determine whether the upper area of the running area is in a normal state, and, if the upper area is in a normal state, perform reprogramming of the upper area.

According to an embodiment of the present disclosure, when it is impossible to enter the upper area of the running area of the ECU 32, the diagnostic device 31 may forcibly manipulate the state of the upper area into an abnormal state and then forcibly induce the entry into the upper area.

For example, when the ECU 32 is running in the boot area, when the boot ROM identification information of the ECU 32 does not match the reprogram ROM identification information of the diagnostic device 31, that is, in cases where reprogram of the ECU 32 is required and in a situation where the ECU 32 cannot receive the BSL area entry CAN message due to problems in the network environment at the time of booting, the diagnostic device 31 may force to enter into the BSL area according to the abnormal state of the boot area by deleting the boot area so that the boot area is in an abnormal state at the time of booting of the ECU 32. Accordingly, boot reprogramming may be performed by checking whether the ROM identification information in the BSL area matches the reprogram ROM identification information of the diagnostic device 31. The method of manipulating the boot area into an abnormal state to force entry into the BSL area is described later.

According to an embodiment of the present disclosure, reprogramming of the ECU 32 may be performed with the diagnostic device 31 as the main subject as described above, but the present disclosure is not necessarily limited thereto, and the ECU 32 may be the main subject and carry out it.

For example, in the case of an ECU included in a vehicle's embedded system, the ECU 32 may receive an electronic signal and determine the peculiarities of the current vehicle's embedded system to determine whether there is a problem. This may refer to a device that performs mechanical control of a vehicle's engine and transmission.

According to an embodiment of the present disclosure, while running the boot area, the ECU 32 may enter the BSL area and perform reprogramming of the boot area.

A case where the ECU 32 enters the BSL area may be 1) the case where a BSL entry CAN message is received at the time of booting of the ECU 32; 2) the case where the boot ROM identification information in the boot reprogram sequence of the ECU 32 in normal operation matches the reprogram ROM identification information of the diagnostic device 31; and 3) the case where the boot area is not in a normal state at the time of booting the ECU 32.

According to an embodiment of the present disclosure, if the ECU 32 cannot enter the BSL area because none of the cases 1) to 3) apply, the ECU 32 may forcibly enter the BSL area, and the same method as the method described in relation to the diagnostic device 31 may be applied. The method is described in detail again later.

It should be noted that each component of the embedded system shown in FIG. 2 represents functionally distinct functional elements, and that multiple components may be implemented in an integrated form in an actual physical environment. For example, at least some of the diagnostic device 31 and the ECU 32 may be implemented in the form of different logic within one physical computing device.

Additionally, in an actual physical environment, each of the above components may be implemented as separated into a plurality of detailed functional elements. For example, a first function of ECU 32 may be implemented in a first computing device and a second function may be implemented in a second computing device.

An embedded system and network environment for reprogramming an ECU according to an embodiment of the present disclosure have been described with reference to FIG. 2. Hereinafter, a method for reprogramming a boot area of an ECU according to various embodiments of the present disclosure is described in detail. In order to provide convenience of understanding, the description of the method is with respect to the environment shown in FIG. 2, but those having ordinary skill in the art should clearly understand that the environment in which difference updates are provided may be modified.

Each step of the methods to be described below may be performed by a computing device. In other words, each step of the above methods may be implemented as one or more instructions executed by a processor of a computing device. All steps included in the methods may be performed by a single physical computing device, but the first steps of the method may be performed by a first computing device and the second steps of the method may be performed by a second computing device. That is, each step of the method may be performed by a computing system. Hereinafter, unless otherwise specified, the description is continued assuming that each step of the above method is performed by the diagnostic device 31 or the ECU 32. However, for convenience of explanation, the description of the operator of each step included in the method may be omitted. In addition, in the methods to be described later, the execution order of each operation may be changed within the range where the execution order may be logically changed as needed.

Figure 3:
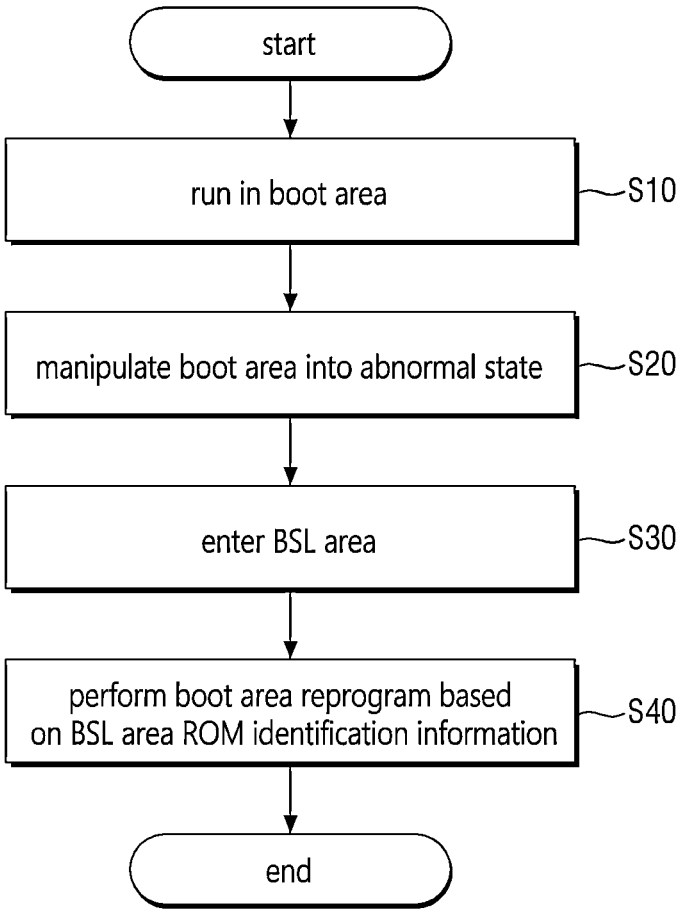
FIG. 3 depicts a flowchart for explaining a boot area reprogramming method according to an embodiment of the present disclosure.

FIG. 3 depicts a flowchart for explaining a boot area reprogramming method according to an embodiment of the present disclosure.

In step S10, software may be running in the boot area of the ROM. At this time, a reprogram of the boot area of the ROM may be necessary.

According to an embodiment of the present disclosure, there may be a situation where it is impossible to enter the BSL area, which is a lower area of the boot area where a boot reprogram is performed.

In step S20, in a situation where entry into the BSL area is impossible as described above, a manipulation may be performed to bring the boot area into an abnormal state in order to enter the BSL area.

According to an embodiment of the present disclosure, the boot area may be deleted to render the boot area in an abnormal state. The method for rendering the boot area into an abnormal state of the present disclosure is not limited to this, and various known methods for manipulating the boot area into an abnormal state may be used.

According to an embodiment of the present disclosure, manipulating the boot area into an abnormal state may be performed in the software itself, or may be performed through a controller in an external device such as a diagnostic device.

In step S30, if the software is reset after the boot area enters an abnormal state, the abnormal state of the boot area is confirmed at the booting time and entry into the BSL area of the software ROM may be performed.

In step S40, a reprogram of the boot area, which is an upper area, may be performed based on the ROM identification information of the BSL area.

According to an embodiment of the present disclosure, it is checked whether the ROM identification information of the BSL area matches the ROM identification information to be reprogrammed, and if they match, a reprogram of the boot area may be performed.

The above-described embodiments may be applied not only when software is running in the boot area, but also when software is running in the NORMAL area. For example, when software is running in the NORMAL area, and the NORMAL area is forcibly manipulated into an abnormal state and the software is reset, a reprogram of the NORMAL area may be performed in the boot area.

According to the above-described embodiments, when software is running in the upper area and it is impossible to enter into the lower area for reprogramming of the upper area, and when the upper area is manipulated into an abnormal state, such as deleting the upper area, and then the software is reset, the conditions for entering the lower area are satisfied, and reprogramming of the upper area may be performed after entering the lower area.

Figure 4:
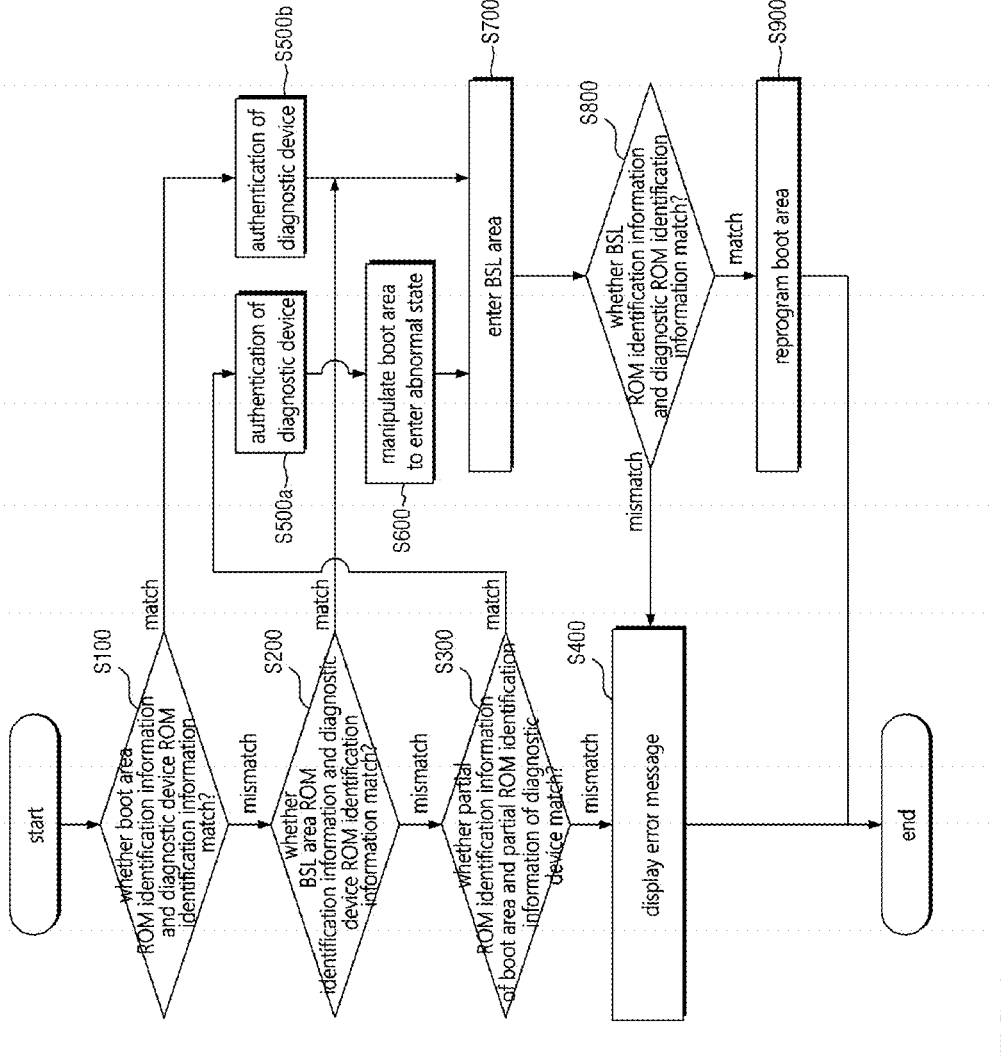
FIG. 4 depicts a flowchart illustrating a method for reprogramming a boot area of an ECU according to an embodiment of the present disclosure.

FIG. 4 depicts a flowchart illustrating a method for reprogramming a boot area of an ECU according to an embodiment of the present disclosure. Here, it is assumed that the ECU is running in the boot area.

In step S100, it is determined whether the boot area ROM identification information and the reprogram ROM identification information of the diagnostic device 31 match. The determination of whether the ROM identification information matches is made by checking whether the ROM identification information of the ECU 32 and the diagnostic device 31 matches to prevent reprogramming to other vehicle models, other controllers, and other software versions. If they do not match, a reprogram is not performed.

The ROM identification information of the boot area is described with reference to FIG. 5.

Figure 5:
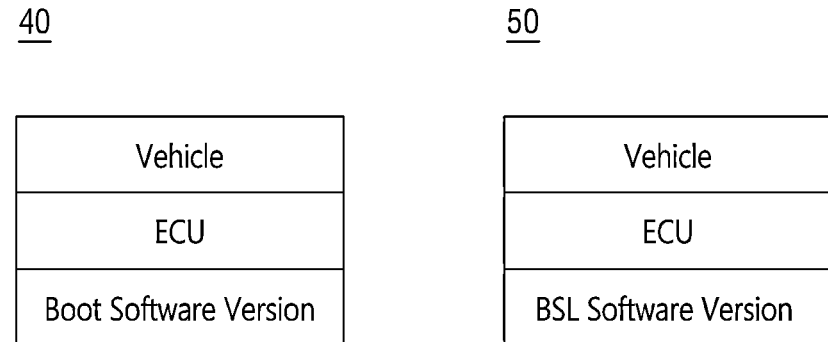
FIG. 5 depicts a diagram for explaining in more detail the ROM identification information described with reference to FIGS. 3 and 4 according to an embodiment of the present disclosure.

Referring to FIG. 5, ROM identification information 40 of the boot area is shown. The ROM identification information of the boot area may include vehicle model information, electronic control unit (ECU) information, and boot area software version information.

According to an embodiment of the present disclosure, the ROM identification information in the boot area may include various information for identifying the ROM of the ECU 32 in addition to the above information.

This is described again with reference to FIG. 4.

According to an embodiment of the present disclosure, the ROM identification information in the boot area may be verified using a ROM identification information verification diagnostic code from the ECU 32. For example, when the ECU 32 is running in the boot area or the NORMAL area, boot ROM identification information may be identified.

In step S500b, in response to a determination that the ROM identification information of the boot area of the ECU 32 and the reprogram ROM identification information of the diagnostic device 31 match, authentication of the diagnostic device 31 may be performed.

According to an embodiment of the present disclosure, authentication of the diagnostic device 31 may be performed using a known seed key check method. For example, when the diagnostic device 31 requests reprogramming to the ECU 32, and the ECU 32 generates a seed value, stores it, and transmits it to the diagnostic device 31, the diagnostic device 31 may generates a key value using the received seed value and key generation function and transmit it to the ECU 32, and the ECU 31 may generate a key value using the previously stored seed value and key generation function, and perform authentication by comparing the generated key value with the key value received from the diagnostic device to determine whether they match.

When authentication of the diagnostic device 31 is completed, entry into the BSL area of the ROM of the ECU 32 is performed (S700), and it is determined whether the BSL ROM identification information matches the ROM identification information of the diagnostic device 31 (S800), if they match, reprogramming of the boot area may be performed (S900).

In step S200, in response to determining that the ROM identification information in the boot area of the ECU 32 and the reprogram ROM identification information of the diagnostic device 31 do not match, it may be determined whether the ROM identification information in the BSL area of the ECU 32 and the ROM identification information of the diagnostic device 31 match.

Here, the ROM identification information in the BSL area is described with reference to FIG. 5.

Referring to FIG. 5, ROM identification information 50 in the BSL area is shown. Here, the ROM identification information in the BSL area may include vehicle model information, electronic control unit (ECU) information, and BSL area software version (BSL Software Version) information.

According to an embodiment of the present disclosure, the ROM identification information in the BSL area may include various information for identifying the ROM of the ECU 32 in addition to the above information.

This is described again with reference to FIG. 4.

The case where the ROM identification information of the boot area of the ECU 32 and the reprogram ROM identification information of the diagnostic device 31 do not match, for example, may be the case where the boot software version changes among the reprogram ROM identification information of the diagnostic device 31 due to a change in the boot function, making boot reprogram impossible due to mismatch in identification information.

At this time, a function of maintaining the execution area of the ECU 32 as the BSL area may be implemented to enable reprogramming. For example, when the ECU 32 boots, the ECU 32 receives a CAN message containing a specific password, so that the ECU 32 stays in the BSL area and boot reprogramming may be performed. However, if the CAN message is not received due to problems such as the network environment, boot reprogramming may not be performed. The method of the present disclosure for enabling boot reprogramming is described later in step S600.

In step S700, in response to a determination that the ROM identification information in the BSL area of the ECU 32 and the ROM identification information of the diagnostic device 31 match, entry into the BSL area may be performed (S700).

After entry into the BSL area is performed (S700), it is determined whether the BSL ROM identification information and the ROM identification information of the diagnostic device 31 match (S800), and if they match, reprogramming of the boot area may be performed (S900).

In step S300, in response to determining that the ROM identification information of the BSL area of the ECU 32 and the ROM identification information of the diagnostic device 31 do not match, it is determined whether partial ROM identification information of the boot area of the ECU 32 and partial ROM identification information of the diagnostic device 31 match.

The partial ROM identification information may be the minimum ROM information required for reprogramming. For example, the partial ROM identification information may be vehicle model information and ECU information.

In step S400, if the partial ROM identification information in the boot area of the ECU 32 and the partial ROM identification information of the diagnostic device 31 do not match, an error message may be displayed.

In step S500a, in response to a determination that the ROM identification information in the boot area of the ECU 32 and the reprogram ROM identification information of the diagnostic device 31 match, authentication of the diagnostic device 31 may be performed. Here, the authentication method in step S500b may be applied as the authentication method of the diagnostic device 31.

In step S600, the boot area of the ECU 32 may be manipulated to enter an abnormal state.

According to an embodiment of the present disclosure, manipulating the boot area into an abnormal state may mean, for example, manipulating the boot area to be deleted.

In step S700, when the ECU 32 is reset, the boot area is in an abnormal state at the time of booting the ECU 32, so entry into the BSL area may be performed.

In step S800, it is determined whether the BSL ROM identification information matches the ROM identification information of the diagnostic device 31, and if they match, reprogramming of the boot area may be performed in step S900. If they do not match, an error message may be displayed (S400).

According to the above-described embodiments, when the diagnostic device 31 and the ECU 32 are running in the boot area, in the case where the boot ROM identification information of the ECU 32 matches the reprogram ROM identification information of the diagnostic device 31, that is, the case where reprogramming of the ECU 32 is required, and in a situation where the ECU 32 cannot receive the BSL area entry CAN message due to problems in the network environment at the time of booting, by forcibly deleting the boot area so that the boot area is in an abnormal state at the time of booting the ECU 32, entry into the BSL area may be forced according to the abnormal state of the boot area. Accordingly, boot reprogramming may be performed by checking whether ROM identification information in the BSL area and the reprogram ROM identification information in the diagnostic device 31 match.

Figure 6:
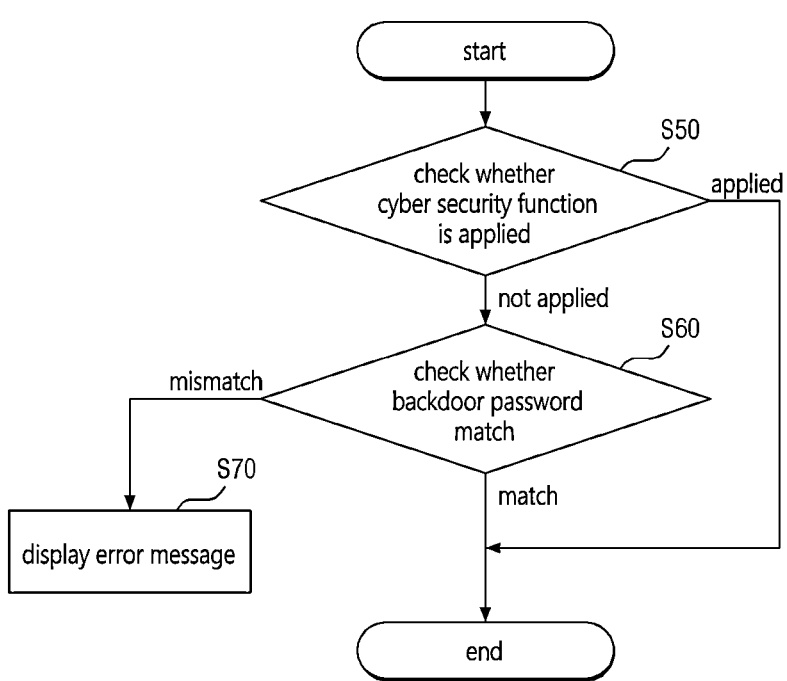
FIG. 6 depicts a flowchart for explaining a method of security enhanced reprogramming an ECU according to an embodiment of the present disclosure.

FIG. 6 depicts a flowchart for explaining a method of reprogramming an ECU with enhanced security, according to an embodiment of the present disclosure. Here, steps S50 to S70 may be performed during the reprogramming process of the ECU 32 described in FIG. 4.

Referring to FIG. 6, it may be confirmed whether the cyber security function of the ECU 32 is applied. Here, the cyber security function may be, for example, a Secure Flash function that verifies whether the software of the embedded system is valid software through an electronic signature verification method. However, the cyber security function of the present disclosure is not limited to this, and various known cyber security functions may be applied to the ECU 32 and the diagnostic device 31.

According to an embodiment of the present disclosure, step S50 may be performed as a step following step S100 of FIG. 4. That is, if the identification information of the boot area ROM of the ECU 32 and the identification information of the reprogram ROM of the diagnostic device 31 match, it may be checked whether the cyber security function of the ECU 32 is applied in step S50.

According to an embodiment of the present disclosure, step S50 may be performed as a step following step S300 of FIG. 4. That is, if partial information of the ROM identification information of the boot area of the ECU 32 and the corresponding identification information of the reprogram ROM of the diagnostic device 31 match, it may be checked whether the cyber security function of the ECU 32 is applied in step S50.

When it is confirmed that the cyber security function is applied, that is, when it is confirmed that the cyber security functions of both the ECU 32 and the diagnostic device 31 are applied, the backdoor procedure is unnecessary. If the cyber security function is not applied to the reprogram ROM of the diagnostic device 31, going through the cyber security function application procedure every time when developing a program causes unnecessary consumption of time and cost, so by adding a backdoor function that enables reprogram to be performed by skipping the cyber security function application procedure and immediately proceeding to the next procedure depending on whether the backdoor password matches. If the cyber security function is applied to both the ECU 32 and the diagnostic device 31, the backdoor function is unnecessary.

When it is confirmed that the cyber security function is not applied, that is, the cyber security function is applied to the ROM mounted on the ECU, and the cyber security function is not applied to the reprogram ROM mounted on the diagnostic device 31, step S60 may be performed.

Figure 7:
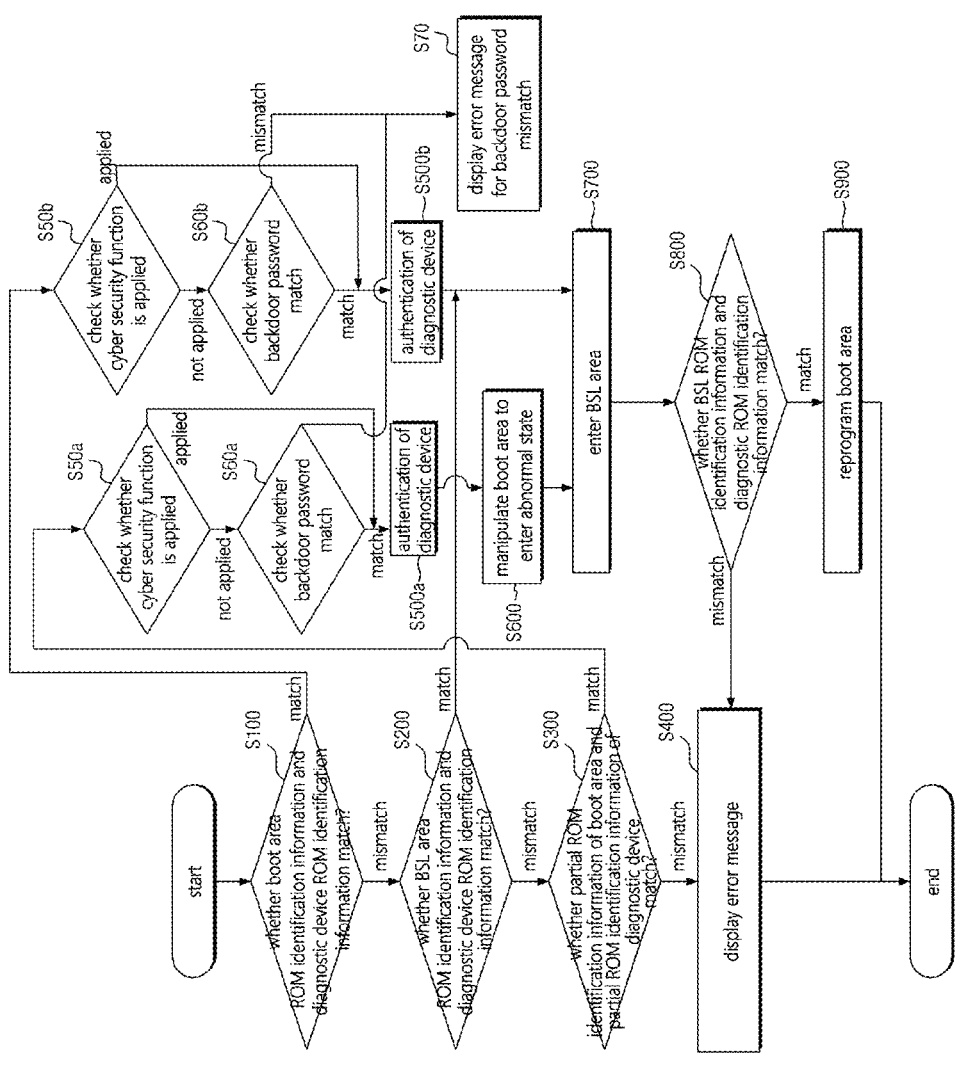
FIG. 7 depicts a flowchart illustrating a security enhanced reprogramming method of an ECU according to embodiments of the present disclosure.

FIG. 7 depicts a flowchart illustrating an exemplary security-enhanced reprogramming method of ECU according to an embodiment of the present disclosure.

Referring to FIG. 7, a specific method of enhancing security in the method of reprogramming the boot area of the ECU 32 is presented. Here, the reprogramming method described in FIG. 4 is applied to some steps as is.

The method of enhancing security in the specific reprogramming process shown in FIG. 7 may be referenced with the information previously described with reference to FIGS. 4 and 6.

According to the above-described embodiments, loss of security function may be prevented by going through a process of determining whether the cyber security function of the ECU and diagnostic device is applied during the boot area reprogramming process.

Figure 8:
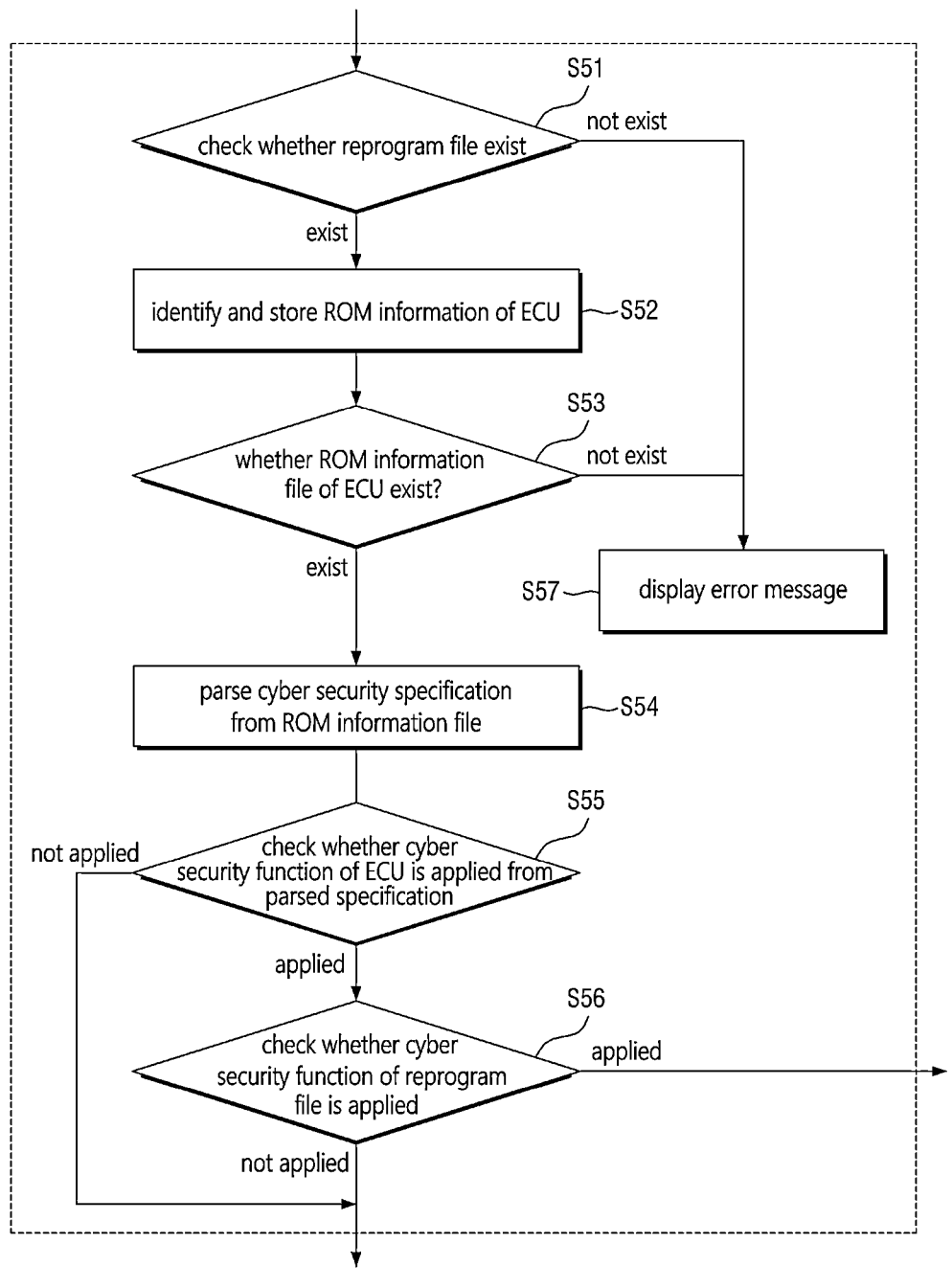
FIG. 8 depicts a detailed flowchart illustrating a method for checking whether the cyber security function is applied described with reference to FIG. 6 according to an embodiment of the present disclosure.

FIG. 8 depicts a detailed flowchart illustrating a method for checking whether the cyber security function described is applied with reference to FIG. 6.

Referring to FIG. 8, first, the presence of a reprogram file may be checked in step S51. The reprogram file may be a reprogram ROM mounted on the diagnostic device 31, and may be a HEX format file, for example.

According to an embodiment of the present disclosure, as a specific method of determining the presence of a reprogram file, the presence of a HEX file may be checked and the validity of the HEX file may be verified by checking whether it has a size larger than the security specification address, which is a fixed address.

In consideration of future entry into the backdoor function, it may be determined whether the HEX file has a size larger than the backdoor password address during the validation verification process of the HEX file. In other words, it may be determined whether the HEX file has a size greater than the security specification address, which is a fixed address, and backdoor password address.

In step S57, in response to determining that the reprogram file does not exist in step S57, an error message may be displayed (S57). For example, a user who wants to reprogram the ECU 32 included in the embedded system 30 may view the error message displayed through the display screen mounted on the diagnostic device 31.

In step S52, in response to the determination that a reprogram file exists, the ROM identification information of the ECU 32 may be identified, and the ROM identification information may be stored in the diagnostic device 31. The ROM identification information may be transmitted from the ECU 32 to the diagnostic device 31 through diagnostic communication and may be stored in the diagnostic device 31 as a binary file.

In step S53, it may be determined whether a ROM identification information file of the ECU 32 exists. The ROM identification information file may be a boot ROM identification information file.

According to an embodiment of the present disclosure, as a specific method of determining whether a ROM identification information file of the ECU 32 exists, it may be checked whether the ROM identification information size and the binary value size of the ROM identification information file match.

In step S57, in response to the determining that the ROM identification information file of the ECU 32 does not exist, an error message may be displayed (S57).

In step S54, in response to determining that the ROM identification information file of the ECU 32 exists, a cyber security specification may be parsed from the ROM identification information file.

In step S55, it may be checked whether the cyber security function of the ECU 32 is applied from the parsed cyber security specifications.

According to an embodiment of the present disclosure, when it is confirmed that the cyber security function of the ECU 32 is not applied from the parsed cyber security specification, a step of checking whether the backdoor password matches, regardless of whether the cyber security function of the reprogram file is applied, may be performed (S60).

In step S56, if it is confirmed that the cyber security function of the ECU 32 is applied from the parsed cyber security specification, it may be confirmed whether the cyber security function of the reprogram file is applied. The reprogram file may mean a reprogram ROM file mounted on the diagnostic device 31. For example, the reprogram ROM file may be a HEX file.

A specific method of checking whether the cyber security function is applied to the reprogram file may be to check whether the cyber security function is applied by checking the security specifications of the reprogram file, that is, the HEX file.

According to an embodiment of the present disclosure, when it is confirmed that the cyber security function of the reprogram file is applied, the backdoor password checking step may not be performed because the cyber security function is applied to both the ECU 32 and the diagnostic device 31. Therefore, referring to FIG. 4, the diagnostic device authentication step (S500a or S500b) may be performed immediately without going through the backdoor password checking step.

According to an embodiment of the present disclosure, when it is confirmed that the cyber security function of the reprogram file is not applied, S60 of the backdoor password match checking step may be performed.

Referring again to FIG. 6, when it is confirmed that the cyber security function is not applied, that is, the cyber security function is applied to the ROM mounted on the ECU 32, and the cyber security function is not applied to the reprogram ROM mounted on the diagnostic device 31, or if it is confirmed that the cyber security function is not applied to the ROM mounted on the ECU 32, step S60 may be performed.

In step S60, it may be checked whether the backdoor passwords between the ECU 32 and the diagnostic device 31 match. Here, checking whether the backdoor passwords match may mean checking whether the backdoor function has been applied to the diagnostic device 31.

According to an embodiment of the present disclosure, as a specific method of checking whether the backdoor passwords between the electronic control device 32 and the diagnostic device 31 match, the backdoor password of the HEX file of the diagnostic device 31 may be checked and decrypted, and then it may be checked whether it matches the backdoor password that exists inside the execution file in the ECU 32.

According to an embodiment of the present disclosure, when it is confirmed that the cyber security function of the ROM of the ECU 32 is applied, the first backdoor password for the cyber security function of the ROM of the ECU 32 is received, and if the received first backdoor password is the same as the second backdoor password included in the program data stored in the ROM of the ECU 32, the ECU 32 may be reprogrammed without additional procedures related to the cyber security function. The first backdoor password may be a backdoor password stored in the reprogram ROM file of the diagnostic device 31.

According to an embodiment of the present disclosure, additional procedures related to the cyber security function may be a procedure, for example, in which, if the cyber security function of the ROM of the ECU 32 is applied and the cyber security function of the reprogram ROM of the diagnostic device 31 is not applied, for the reprogram ROM, to which the cyber security function is not applied, it is to log in to the Fil byte and ASIMS sites and receive an electronic signature according to the site's sequence to generate a new reprogram ROM.

According to the above-described embodiments, by using the backdoor function, convenience in the development process may be increased by enabling a reprogram and omitting the procedure for adding a cyber security function to the reprogram ROM.

Figure 9:
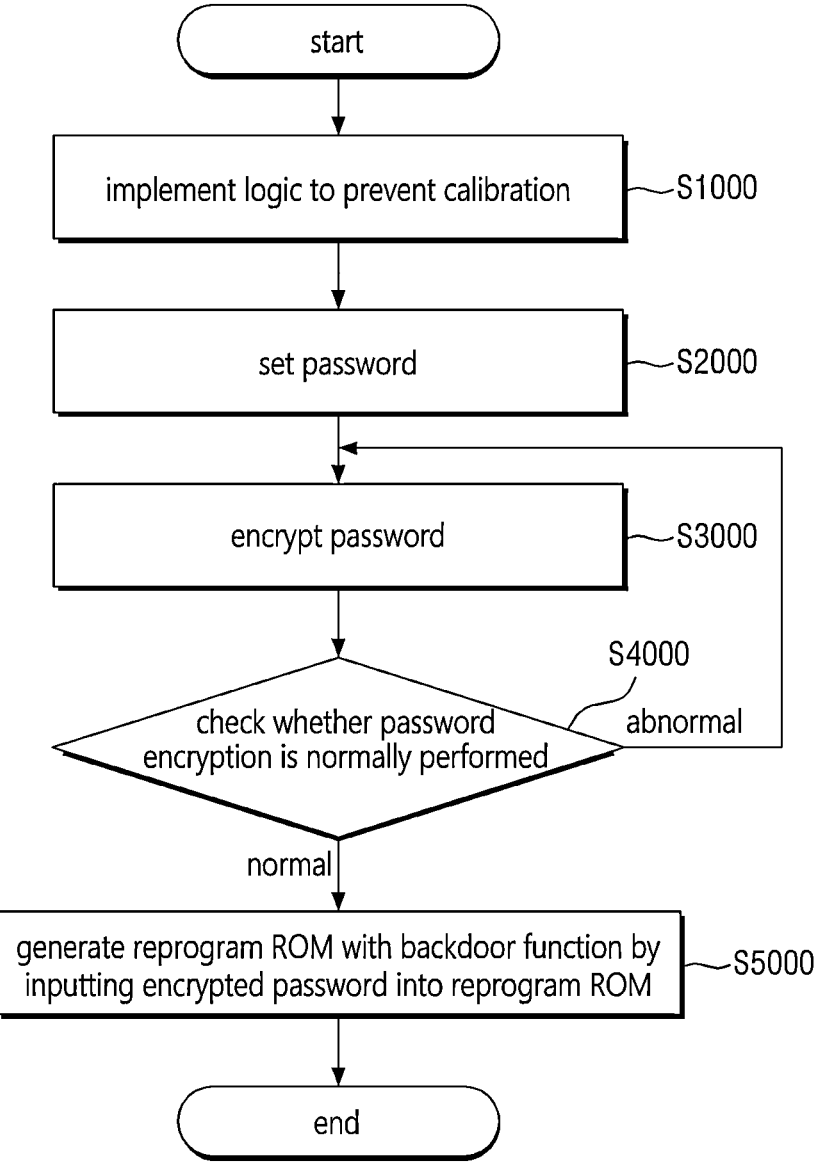
FIG. 9 depicts a flowchart illustrating a method of generating a reprogram ROM to which a backdoor function is applied, according to an embodiment of the present disclosure.

FIG. 9 depicts a flowchart for explaining a method of generating a reprogram ROM to which a backdoor function is applied, according to an embodiment of the present disclosure.

Referring to FIG. 9, since the backdoor password corresponds to a fixed address in step S1000, logic to prevent calibration of the backdoor password may be implemented. Here, the logic to prevent calibration may be, for example, setting the address of a location where calibration of the backdoor password is not possible.

In step S2000, the backdoor password may be set.

According to an embodiment of the present disclosure, the backdoor password may be arbitrarily set by the user. At this time, the backdoor password may be set with the constraints of having a specific size and fixed value.

In step S3000, the backdoor password may be encrypted. Here, an encryption algorithm such as CRC, SHA1, or SHA2 may be used depending on the security level.

In step S4000, it may be checked whether backdoor password encryption is normally performed.

According to an embodiment of the present disclosure, it may be checked whether the backdoor password encryption is normally performed by decrypting the encrypted backdoor password according to a set algorithm and checking the password.

If the backdoor password encryption is not normally performed, the backdoor password encryption in the S3000 step may be performed again.

In step S5000, in response to confirming that the backdoor password encryption is normally performed, the encrypted backdoor password may be input into the reprogram ROM to generate a reprogram ROM with a backdoor function.

According to the above-described embodiments, by setting a backdoor function, that is, a backdoor password, in a reprogram ROM that is not equipped with a backdoor function, when developing a program, it is possible to minimize unnecessary consumption of time and resources by allowing reprogram of a reprogrammed ROM that is not equipped with a cyber security function regardless of whether it is equipped with a cyber security function.

Figure 10:
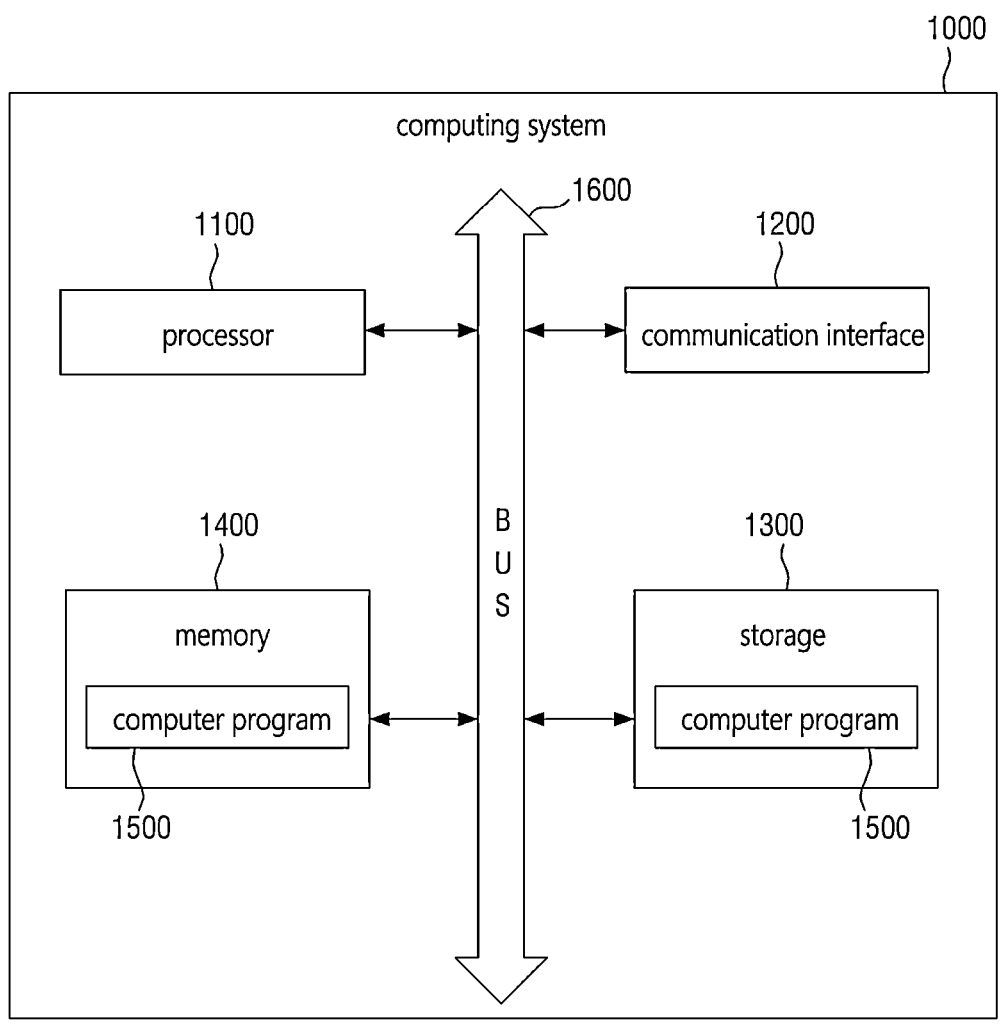
FIG. 10 depicts a hardware configuration diagram of a computing system according to embodiments of the present disclosure.

FIG. 10 depicts a hardware configuration diagram of a computing system according to an embodiment of the present disclosure. The computing system 1000 shown in FIG. 10 may refer to, for example, a computing system including the ECU 32 described with reference to FIG. 2, or may refer to a computing system including the diagnostic device 31. The computing system 1000 may include one or more processors 1100, a system bus 1600, a communication interface 1200, a memory 1400 that loads a computer program 1500 executed by the processor 1100, and a storage 1300 that stores a computer program 1500.

According to an embodiment of the present disclosure, the computing system 1000 may be a microcomputer implemented in the form of a single SoC (System on Chip).

The processor 1100 controls the overall operation of each component of the computing system 1000. The processor 1100 may perform operations on at least one application or program to execute methods/operations according to various embodiments of the present disclosure. Here, the processor 1100 may be, for example, a microprocessor.

The memory 1400 stores various data, commands and/or information. The memory 1400 may load one or more computer programs 1500 from the storage 1300 to execute methods/operations according to various embodiments of the present disclosure. The bus 1600 provides communication functions between components of computing device 1000. The communication interface 1200 supports Internet communication of the computing system 1000. The storage 1300 may non-temporarily store one or more computer programs 1500. The computer program 1500 may include one or more instructions implementing methods/operations according to various embodiments of the present disclosure. When the computer program 1500 is loaded into the memory 1400, the processor 1100 may perform methods/operations according to various embodiments of the present disclosure by executing the one or more instructions.

In some embodiments, the computer program 1500 may include, for example, in a method performed by an ECU, instructions for performing the steps including checking whether a cyber security function of a ROM of the ECU is applied while the ECU is running in a NORMAL area, receiving, when it is confirmed that the cyber security function of the ROM of the ECU is applied, a first backdoor password for the cyber security function of the ROM of the ECU, and performing, when the received first backdoor password is the same as a second backdoor password included in program data stored in the ROM of the ECU, reprogram of the ECU without additional procedures related to the cyber security function.

Embodiments of the present disclosure and the effects according to embodiments thereof have been mentioned with reference to FIGS. 1 to 10. The effects according to the technical idea of the present disclosure are not limited to the forementioned effects, and other unmentioned effects may be clearly understood by those having ordinary skill in the art from the description of the specification.

The technical features of the present disclosure described so far may be embodied as computer readable codes on a computer readable medium. The computer readable medium may be, for example, a removable recording medium (CD, DVD, Blu-ray disc, USB storage device, removable hard disk) or a fixed recording medium (ROM, RAM, computer equipped hard disk). The computer program recorded on the computer readable medium may be transmitted to other computing device via a network such as internet and installed in the other computing device, thereby being used in the other computing device.

Although operations are shown in a specific order in the drawings, it should not be understood that desired results may be obtained when the operations must be performed in the specific order or sequential order or when all of the operations must be performed. In certain situations, multitasking and parallel processing may be advantageous. According to the above-described embodiments, it should not be understood that the separation of various configurations is necessarily required, and it should be understood that the described program components and systems may generally be integrated together into a single software product or be packaged into multiple software products.

Those having ordinary skill in the art should appreciate that many variations and modifications may be made to the preferred embodiments without substantially departing from the principles of the present disclosure. Therefore, the disclosed preferred embodiments of the disclosure are used in a generic and descriptive sense only and not for purposes of limitation.

What is claimed is:

1. A method performed by an electronic control unit (ECU) for reprogramming with enhanced security, the method comprising:

verifying that a cyber security function that requires acquisition of an electronic signature, of a ROM of the ECU is applied and a cyber security function of a reprogram ROM of a diagnostic device is not applied while the ECU is running in a NORMAL area;

after it is confirmed that the cyber security function of the ROM of the ECU is applied and it is confirmed that the cyber security function of a reprogram ROM of a diagnostic device is not applied, receiving a first backdoor password for the cyber security function of the ROM of the ECU; and after confirming that the received first backdoor password is the same as a second backdoor password included in program data stored in the ROM of the ECU, performing reprogramming of the ECU without any electronic signature acquisition procedure.

2. The method of claim 1, wherein performing reprogramming of the ECU comprises:

changing a state of a boot area of the ECU;

entering a Boot Strap Loader (BSL) area of the ECU based on the changed state of the boot area; and performing reprogramming of the boot area by checking ROM information in the BSL area.

3. The method of claim 2 further comprising:

checking, before checking whether the cyber security function of the ROM of the ECU is applied, whether ROM identification information stored in the boot area and ROM identification information stored in a diagnostic device match;

checking, after it is confirmed that the ROM identification information stored in the boot area and the ROM identification information stored in the diagnostic device do not match, whether ROM identification information stored in the BSL area and the ROM identification information stored in the diagnostic device do not match; and checking, after the ROM identification information stored in the BSL area and the ROM identification information stored in the diagnostic device do not match, information necessary for reprogram of the boot area.

4. The method of claim 1, wherein checking whether the cyber security function is applied comprises:

verifying a validity of a reprogram ROM of a diagnostic device;

checking, after the validity is verified, whether the cyber security function of the ECU is applied; and checking, after it is confirmed that the cyber security function of the ECU is applied, whether a cyber security function of the diagnostic device is applied.

5. A method performed by an electronic control unit (ECU) for reprogramming with enhanced security, the method comprising:

verifying that ROM identification information stored in a boot area of the ECU and ROM identification information stored in a diagnostic device do not match;

after confirming that the ROM identification information stored in the boot area and the ROM identification information stored in the diagnostic device do not match, verifying that ROM identification information stored in a Boot Strap Loader (BSL) area and the ROM identification information stored in the diagnostic device do not match;

after confirming that the ROM identification information stored in the BSL area and the ROM identification information stored in the diagnostic device do not match, checking information necessary for reprogram of the boot area;

verifying that a cyber security function that requires acquisition of an electronic signature is applied to each of the ROM of the ECU and a reprogram ROM of the diagnostic device while the ECU is running in a NORMAL area, and in response, reprogramming the ECU; and after it is detecting that the cyber security function is applied to the ROM of the ECU and the cyber security function is no longer applied to the reprogram ROM of the diagnostic device, stopping reprogramming of the ECU.

6. An electronic control unit (ECU) comprising:
one or more processors;
a memory configured to load a computer program executed by the one or more processors; and
a storage configured to store the computer program;
wherein the computer program comprises instructions for performing operations comprising:
checking whether a cyber security function that requires acquisition of an electronic signature, of a ROM of the ECU is applied and whether the cyber security function of a reprogram ROM of a diagnostic device is applied while the ECU is running in a NORMAL area;
receiving, after it is confirmed that the cyber security function of the ROM of the ECU is applied and it is confirmed that the cyber security function of a reprogram ROM of a diagnostic device is not applied, a first backdoor password for the cyber security function of the ROM of the ECU; and
performing, after the received first backdoor password is the same as a second backdoor password included in program data stored in the ROM of the ECU, reprogramming of the ECU without requiring any electronic signature acquisition procedure.

7. The ECU of claim 6, wherein performing reprogramming of the ECU comprises:
changing a state of a boot area of the ECU;
entering a Boot Strap Loader (BSL) area of the ECU based on the changed state of the boot area; and
performing reprogramming of the boot area by checking ROM information in the BSL area.

8. The ECU of claim 7, wherein the computer program further comprises instructions for performing operations comprising:
checking, before checking whether the cyber security function of the ROM of the ECU is applied, whether ROM identification information stored in the boot area and ROM identification information stored in a diagnostic device match;
checking, after it is confirmed that the ROM identification information stored in the boot area and the ROM identification information stored in the diagnostic device do not match, whether ROM identification information stored in the BSL area and the ROM identification information stored in the diagnostic device do not match; and
checking, after the ROM identification information stored in the BSL area and the ROM identification information stored in the diagnostic device do not match, information necessary for reprogram of the boot area.

9. The ECU of claim 6, wherein checking whether the cyber security function is applied comprises:
verifying a validity of a reprogram ROM of a diagnostic device;
checking, after the validity is verified, whether the cyber security function of the ECU is applied; and
checking, when it is confirmed that the cyber security function of the ECU is applied, whether a cyber security function of the diagnostic device is applied.

10. An electronic control unit (ECU) comprising:
one or more processors;
a memory configured to load a computer program executed by the one or more processors; and
a storage configured to store the computer program;
wherein the computer program comprises instructions for performing operations comprising:
checking whether ROM identification information stored in a boot area of the ECU and ROM identification information stored in a diagnostic device match;
checking, after it is confirmed that the ROM identification information stored in the boot area and the ROM identification information stored in the diagnostic device do not match, whether ROM identification information stored in a Boot Strap Loader (BSL) area and the ROM identification information stored in the diagnostic device do not match;
checking, after the ROM identification information stored in the BSL area and the ROM identification information stored in the diagnostic device do not match, information necessary for reprogram of the boot area;
checking whether a cyber security function that requires acquisition of an electronic signature, is applied to each of the ROM of the ECU and a reprogram ROM of the diagnostic device while the ECU is operating in a NORMAL area, and in response, reprogramming the ECU; and
stopping the reprogramming of the ECU, after it is confirmed that the cyber security function is applied to the ROM of the ECU and that the cyber security function is no longer applied to the reprogram ROM of the diagnostic device.

* * * * *